United States Patent [19]
Fujii

[11] 4,020,720
[45] May 3, 1977

[54] APPARATUS FOR TIGHTENING HIGH-STRENGTH STEEL BOLTS

[76] Inventor: Kaneharu Fujii, No. 502, Tatzunodai, Zama Kanagawa, Japan

[22] Filed: Dec. 12, 1975

[21] Appl. No.: 640,264

Related U.S. Application Data

[62] Division of Ser. No. 584,028, June 4, 1975, abandoned.

[52] U.S. Cl. .................................. 81/57.38
[51] Int. Cl.² .................................. B25B 29/02
[58] Field of Search ............... 81/57.38; 254/29 A

[56] References Cited

UNITED STATES PATENTS

| | | | |
|---|---|---|---|
| 3,128,990 | 4/1964 | Brooks et al. | 81/57.38 |
| 3,162,071 | 12/1964 | Biach | 81/57.38 |
| 3,847,041 | 11/1974 | Meschonat et al. | 81/57.38 |

*Primary Examiner*—James L. Jones, Jr.
*Attorney, Agent, or Firm*—Wenderoth, Lind & Ponack

[57] ABSTRACT

In the steel construction using high-strength steel bolts which are tightened in a pretensioned state, a method of and an apparatus for tightening high-strength steel bolts by subjecting the mated nuts to the compressive force which equals substantially the force which places the high-strength steel bolts in the pretensioned state.

3 Claims, 9 Drawing Figures

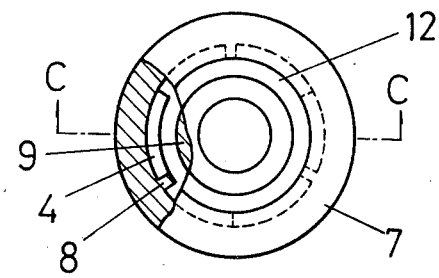
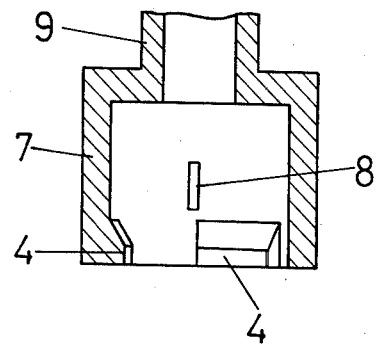
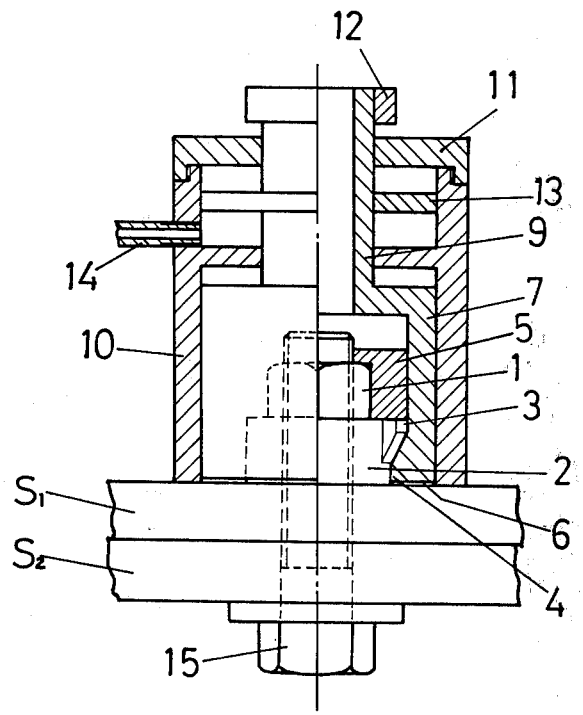

APPARATUS FOR TIGHTENING HIGH-STRENGTH STEEL BOLTS

This is a divisional application of Ser. No. 584,028, filed June 4, 1975, now abandoned.

BACKGROUND OF THE INVENTION

This invention relates to a method of an apparatus for tightening high-strength steel bolts in a pretensioned state, and more particularly to an improved method of and apparatus for tightening high-strength steel bolts with greater accuracy and with greater efficiency.

In conventional steel construction using high-strength steel bolts for joining the structural members, the widely-used process consists of tightening high-strength steel bolts in the manner in which ordinary bolts other than the high-strength steel bolts are tightened by simply turning the mated nuts. However, high-strength steel bolts are subjected to an amount of axial force greater than the ordinary bolts, and the frictional resistance produced by the contact of the mated nut against the face of an object to be fastened or the face of a washer increases with the greater axial force to which the bolt is subjected, so that the greater torque is required to tighten the bolt. This results in the tightening work becoming extremely difficult, and it is impossible exactly to determine the desired axial force applied to the bolt.

In order to improve the known tightening method above-mentioned to overcome the problems thereof, it is conceivable that high-strength steel bolts may be tightened by using the pretensioning method, and there is a device practically employed for this purpose. In the pretensioning method, the known device has an extremely limited use, and therefore is only applicable to fastening prestressed concrete steel bars or bolts having a relatively long shank such as ordinary anchor bolts. However, there are not known hereto devices which can practically be used for tightening bolts having a relatively short shank, such as the bolts employed for joining ordinary structural members of bridges, buildings and the like, for example.

In the pretensioning method using the short-shank bolts, the mated nuts are tightened with the bolts in a pretensioned state. However, the nuts are subjected to the compressive force as soon as the pretensioned bolts are freed from the tensile force. As a result, the bolts are relaxed to greater degrees from the tensile force, which makes it difficult to obtain the desired axial force.

SUMMARY OF THE INVENTION

It is therefore a principal object of the present invention to provide a method of and an apparatus for tightening high-strength steel bolts in a pretensioned state with higher efficiency, precision and accuracy regardless of the length of the bolt shanks.

In accordance with the present invention, the desired tensile force can be introduced into high-strength steel bolts with great accuracy. More particularly, this can be achieved by tightening the mated nut in the state in which the nut is beforehand subjected to the compressive force which equals substantially the tensile force applied to the bolt through the nut or washer-based nut.

Other objects and advantages of the invention will become apparent from the following specification with reference to the accompanying drawings.

BRIEF DESCRIPTION OF DRAWINGS

FIG. 7 is a plan view, partly broken away, of the device 7 provided with hook portions;

FIG. 8 is a cross-secitonal view of the device 7 taken along the line C — C in FIG. 7; and FIG. 9 is a partially cross-sectional front view showing an example of use of the apparatus according to the invention.

DESCRIPTION OF THE PREFERRED EMBODIMENTS

Figure 1:
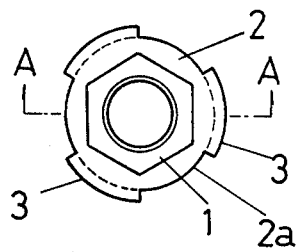
FIG. 1 is a plan view of a nut used for tightening a high-strength steel bolt in accordance with the invention.
Figure 3:
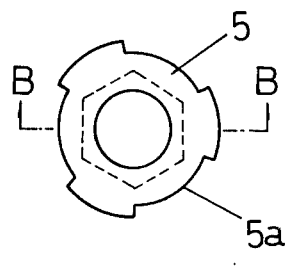
FIG. 3 is a plan view of nut fitting means to fit around the nut.
Figure 2:
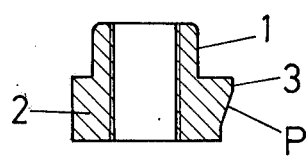
FIG. 2 is a cross-sectional view of the nut taken along the line A — A in FIG. 1.
Figure 4:
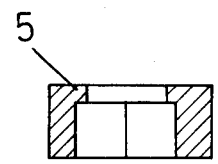
FIG. 4 is a cross-sectional view of the nut fitting means taken along the line B — B in FIG. 3.
Figure 5:
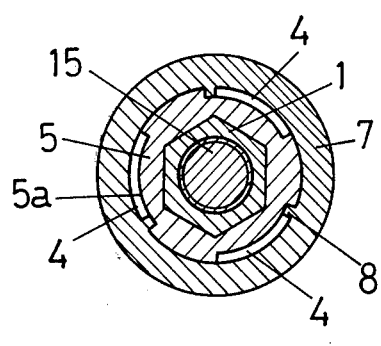
FIG. 5 is a plan view showing a device 7 fitted around the nut.
Figure 6:
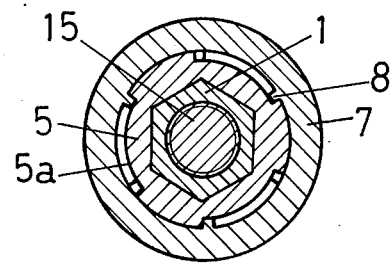
FIG. 6 is a plan view showing the device 7 turned through an angle of 60° from the position in FIG. 5.

The invention will further be described by way of several preferred embodiments thereof with reference to the accompanying drawings in which:

A washer based nut 1 in the form of a hexagon is shown in FIG. 1, and has an integral washer 2 at the base or bottom thereof. The washer 2 has three arcuate projections 3, 3, 3 on the side wall thereof, the projections 3, 3, 3 being spaced at regular intervals and at opening angles of substantially 60° relative to each other and each having a slanted surface P on the lower circumferential portion thereof. A device 7 is shown in FIG. 5 that has three hook portions generally shown at 4 which can engage the corresponding slanted portions P of the washer 2 and which can apply tensile force to a high-strength steel bolt 15 in FIG. 9 through the nut 1 and its washer 2 by turning the device 7. In FIG. 5, a fitting means 5 is provided for engaging the hook portions 4 with the slanted surfaces P of the washer 2 and can fit around the nut 1. The nut fitting member 5 has three cutout portions generally shown at 5a, and can be fitted around the nut 1 by placing the cutout portions 5a in agreement with the cutout portions 2a provided between the adjacent arcuate portions 3, 3 of the washer 2. The device 7 is placed in position so that its hook portions 4 can be inserted inside the overlapped cutout portions 5a and 2a, and is then turned clockwise through an angle of 60° after placing the hook portions 4 below the slanted surfaces P of the washer 2. Thus, the hook portions 4 can be forced inwardly along the slanted surfaces P of the washer, thereby locking the hook portions 4 in position.

As shown in FIG. 8 for example, the hook portions 4 of the device 7 have projecting hook portions 8 at the upper ends thereof, said portions 8 engaging the sides of the cutout portions 5a of the nut fitting member 5, thereby placing the portions 8 in a locked condition. Thus, when the device 7 is turned clockwise, it brings the nut fitting member 5 and the portions 8 into the locked condition so that it can also turn the nut 1 clockwise therewith.

As particularly shown in FIG. 8, the device 7 is provided with a tubular shaft 9 at the upper portion thereof, by means of which the device 7 can be turned.

The tubular shaft 9 extends through a cylinder 10 and projects out from the top 11 of the cylinder 10. The projecting end of the shaft 9 has a connecting portion 12 which connects to an appropriate device which supplies torque through the portion 12 to the shaft 9.

As shown in FIG. 9, the portion of the shaft 9 inside the cylinder 10 is rigidly secured to a piston 13, and a pressure fluid supply pipe 14 extends through the cylinder wall located below the piston 13. The cylinder 10, tubular shaft 9 and piston 13 are combined to provide means for supplying tensile force.

In accordance with the apparatus described above, the bolt 15 is tightened in the two operations which consist of subjecting the bolt shank 15 to tension and turning the mated nut 1. As noted, however, the nut 1 is provided with the washer 2 integrally thereof, and the hook portions 4 of the device 7 are placed in agreement with the corresponding cutout portions 2a of a washer 2 so that the nut 9 can be subjected to tension with the bolt 15 is the tensioned state. It should be noted that the nut fitting member 5 can serve to prevent the nut 1 from turning when the device 7 is turned through the angle of 60° to slidably place the hook portions 4 below the slanted surfaces P of the washer 2. The hook portions 4 are placed in position by turning the device 7 through the angle of 60°, and when the device 7 is turned further, it causes the nut fitting member 5 to be pressed toward the projecting hook portions 8 of the device 7 so that the nut fitting member 5 can be placed in the locked position which permits the turning of the nut 1.

As noted from the above, the nut fitting member 5 serves as a locking means by which the nut 1 can be tightened. If the hook portions 4 and the washer 2 are not placed in the locked condition as it occurs when the device 7 is placed or removed, the nut 1 will not be turned even by turning the device 7. In other words, the nut 1 is capable of turning through the nut fitting member 5 when the hook portions 4 and the washer 2 are securely locked, thereby placing the bolt 15 in condition for being subjected to axial force.

The method of tightening high-strength steel bolts is carried out in accordance with the apparatus described heretofore, which is as follows:

Two steel sheet members $S_1$, $S_2$ to be joined by means of a high-strength steel bolt 15 are shown in FIG. 9. As shown, the sheet members $S_1$, $S_2$ are superposed, through which the bolt 15 is inserted. The washer-based nut 1 in the form of a hexagon in which the washer is shown at 2 is fitted around the bolt 15, and is then tightened by hand. The nut fitting member 5 is then fitted around the nut 1, and its cutout portions 5a are placed in agreement with the cutout portions 2a of the washer 2. The device 7 is next fitted around the nut fitting member 5, and its hook portions 4 are then slidably moved inside the overlapped cutout portions 5a and 2a. The device 7 is then turned clockwise through the angle of 60° so that its hook portions 4 can be placed in the locked relation with the corresponding slanted surfaces P of the washer 2 and the projecting hook portions 8 can also be placed in contact with the sides of the corresponding cutout portions 5a of the nut fitting member 5. Then, pressure fluid such as oil, water or air is introduced through the pipe 14 into the cylinder 10, causing the piston 13 to move upward. With this upward movement of the piston 13, the nut 1 is subjected to a compressive force or is pressed down by means of the tubular shaft 9, hook portions 4 and washer 2, placing the bolt 15 in the tensioned state. In this case, it is possible to measure the pressure level of the introduced fluid, and therefore, to determine the desired tensile force applied to the bolt 15 from the measured pressure level. When the connecting portion 12 of the tubular shaft 9 is turned clockwise with the bolt 15 placed in the tensioned state determined as above, the device 7 is also turned clockwise with the shaft 9, causing the nut 1 to be turned clockwise through the nut fitting member 5. Thus, the nut 1 can be tightened. After the nut 1 is completely tightened, the fluid is removed from the cylinder 10 so that the bolt 15 can be relaxed from the tensile force. The bolt 15 is tensioned by the nut 1, but the nut 1 itself has already been placed in a state of compressive strain by subjecting the nut 1 to the tensile force. Therefore, there is no risk or danger that the nut 1 will be subjected to further compressive strain which occurs when the nut 1 is subjected to the compressive force of the bolt 15. As a result, the tensile force introduced into the bolt 15 will never be lowered, thereby maintaining the bolt 15 in the tensioned state as initially determined and to the required strength.

In the above embodiments, there is provided a small play or clearance 6 between the base or bottom of the device 7 and the steel member $S_1$ to be fastened so that it can maintain the slanted surfaces P of the washer 2 and the hook portions 4 of the device 7 in the gently locked condition. Thus, when the hook portions 4 of the device 7 are placed below the slanted surfaces P of the washer 2, the former 4 will not register with the latter P. When the device 7 is moved up, however, it will cause its hook portions 4 to engage the slanted surfaces P so that axial force can be imparted through the hook portions 4 and slanted sufaces P to the shank of the bolt 15. It should be noted, in this case, that the nut 1 is such that it can be turned by means of the projecting hook portions 8 of the device 7 and the nut fitting member 5, but not by placing the hook portions 4 and the washer 2 in the locked position. Therefore, the nut 1 will not be turned unexpectedly even if the device is turned when it is placed in position or removed. In other words, the nut 1 remains in its original position independently of the turning of the device 7, and is therefore prevented from turning with the device 7.

In accordance with the invention as described heretofore, the required tensile force can be supplied to the bolt by means of the fastening devices such as nuts or washer-based nuts, and the bolt can be tightened under the tensile force by turning the nut or washer-based nut.

As noted above, the invention has the advantage that the tensile force retained by the bolt can be measured and determined, and therefore any required amount of tensile force can be introduced into the bolt. Thus, the method according to the invention has the advantage that the bolt can be maintained to the required strength with great reliability and consistency.

In the above embodiments, the washer-based nut has been referred to for ease of comprehension, but it is not essential for embodying the invention. Varied types of nuts such as separate nuts and washers may be employed, and can serve the objects of the invention described herein.

Although the invention has been described with reference to the several preferred embodiments thereof, it should be understood that various changes and modifications may be made without departing from the scope and spirit of the invention.

What is claimed:

1. An apparatus for tightening a nut and bolt combination under a pretensioned condition, said apparatus comprising:

an externally threaded bolt;

nut means threaded onto said bolt for securing said bolt in position, said nut means comprised of:
an upper nut portion threaded to said bolt, and
a lower nut portion on the side of said upper nut portion opposite the end of said bolt having a diameter greater than said upper nut portion and having first cutout portions about the circumference thereof forming a plurality of first projections about said lower nut portion;

a nut fitting member fitted over and engaging said upper nut portion, said member having a plurality of second cutout portions therein corresponding to said first cutout portions in said lower nut portion therebeneath;

rotatable hook means fitted over and extending above said nut fitting member and said nut means and passing through said first and second cutout portions for engaging said first projections on said lower nut portion and said nut fitting member and for rotating said nut fitting member;

cylinder means surrounding said hook means, said hook means extending therethrough, for exerting pressure on said hook means and causing said hook means engaging said lower nut portion to rise upward; and pressure fluid supply means directed into said cylinder for supplying the fluid thereto to exert pressure on said hook means.

2. An apparatus as claimed in claim 1, wherein said first projection on said lower nut member are tapered inward from the outer edge thereof; and said hook means is comprised of:

a rotatable hollow cylindrical member fitted over and surrounding said nut fitting member and said nut means and extending through the above said cylinder means, said cylindrical member having:
a plurality of second projections at the inside base thereof slanted to correspond to the taper of said first projections and engageable therewith,
a plurality of third projections on the side walls thereof at a location corresponding to the location of said second cutout portions in said nut fitting member, whereby passing said second and third projections through said first and second cutout portions when said cylindrical member is fitted over said nut fitting member and said nut means and rotating said cylindrical member causes said second projections to rotate underneath said first projections and said third projection to contact the edge of said second cutout portion, and
said hollow cylindrical member further having piston means on the portion thereof extending above said nut fitting member and said nut means within said cylinder means above said pressure fluid supply means for receiving the force of the pressure from said fluid supply means, whereby said piston means and said hollow cylinder are forced upward under the influence of said fluid pressure in said cylinder means.

3. An apparatus as claimed in claim 2, wherein:

said first projections are comprised of three projections equally spaced about the circumference of said lower nut portion at angles of 60° relative to each other, and said second projections are comprised of three projections equally spaced about the inside circumference of cylindrical member at angles of 60° relative to each other, whereby inserting said second projections through said first and second cutout portions and rotating said cylindrical member 60° causes said second projections to rotate underneath said first projections.

* * * * *